United States Patent
Nies et al.

(10) Patent No.: US 7,901,184 B2
(45) Date of Patent: Mar. 8, 2011

(54) TORSIONALLY LOADABLE WIND TURBINE BLADE

(75) Inventors: Jacob J. Nies, Zwolle (NL); Axel Braicks, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/485,134

(22) Filed: Jun. 16, 2009

(65) Prior Publication Data

US 2010/0143135 A1    Jun. 10, 2010

(51) Int. Cl.
    *F03D 5/00*    (2006.01)
(52) U.S. Cl. .................................. 416/132 B; 416/225
(58) Field of Classification Search ............... 416/225, 416/226, 233, 132 B
    See application file for complete search history.

(56) References Cited

U.S. PATENT DOCUMENTS

| | | | |
|---|---|---|---|
| 4,003,676 A * | 1/1977 | Sweeney et al. | ......... 416/132 B |
| 5,226,805 A | 7/1993 | Proven | |
| 7,186,083 B2 | 3/2007 | Bayly | |
| 2006/0133937 A1 | 6/2006 | DeLeonardo et al. | |

OTHER PUBLICATIONS

Veers, Bir and Lobnitz, "Aeroelastic tailoring in wind-turbine blade applications" American Wind Energy Association Meeting and Exhibition (1998).

* cited by examiner

*Primary Examiner* — Edward Look
*Assistant Examiner* — Dwayne J White
(74) *Attorney, Agent, or Firm* — William F. Heinze; Ernest G. Cusick; Frank A. Landgraff

(57) ABSTRACT

A torsionally loadable wind turbine blade, includes a loading member secured to a body of the wind turbine blade; and an adjuster for actively displacing the loading member and torsionally deforming the blade on a spanwise axis.

14 Claims, 3 Drawing Sheets

TORSIONALLY LOADABLE WIND TURBINE BLADE

BACKGROUND OF THE INVENTION

1. Technical Field

The subject matter described here generally relates to fluid reaction surfaces with specific blade structures that are formed with a main spar, and, more particularly, to torsion loading for wind turbine blades.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a "hub 9 to form a "rotor" at one end of the drive train 8 outside of the nacelle 6. The rotor drives a gearbox 12 connected to an electrical generator 14 at the other end of the drive train 8 arranged inside the nacelle 6 along with a control system 16 that may receive input from an anemometer 18. The function of a general gearbox is to transfer high torques with low rpm to low torques with high rpm. This can also be done with other torque/speed transfer mechanisms, such as hydraulic systems. Alternative drivetrains connect the rotor and the generator in a way that the rotational speed of rotor and generator are equal.

The blades 10 generate lift and capture momentum from moving air that is them imparted to the rotor as the blades spin in the "rotor plane." Each blade 10 is typically secured to the hub 9 at its "root" end, and then "spans" radially "outboard" to a free, "tip" end. The front, or "leading edge," of the blade 10 connects the forward-most points of the blade that first contact the air. The rear, or "trailing edge," of the blade 10 is where airflow that has been separated by the leading edge rejoins after passing over the suction and pressure surfaces of the blade. A "chord line" connects the leading and trailing edges of the blade in the direction of the typical airflow across the blade. The length of the chord line is simply the "chord." The shape of the blade 10, when viewed perpendicular to the direction of flow, is called the "planform." The thickness of a blade 10 typically varies across the planform and chord.

The blades 10 are typically fabricated by securing various "shell" and/or "rib" portions to one or more "spar" members extending spanwise along the inside of the blade for carrying most of the weight and aerodynamic forces on the blade. Spars are typically configured as I-shaped beams having a web, referred to as a "shear web," extending between two flanges, referred to as "caps" or "spar caps," that are secured to the inside of the suction and pressure surfaces of the blade. However, other spar configurations may also be used including, but not limited to "C-," "D-," "L-," "T-," "X-," "K-," and/or box-shaped beams. The shear web may also be utilized without caps.

"Angle of attack" is a term that is used in to describe the angle between the chord line of the blade 10 and the vector representing the relative motion between the blade and the air. "Pitching" refers to rotating the angle of attack of the entire blade 10 along the spanwise axis into or out of the wind in order to control the rotational speed and/or absorption of power from the wind. For example, pitching the blade "towards feather" rotates of the leading edge of the blade 10 into the wind, while pitching the blades "towards stall" rotates the leading edge of the blade out of the wind.

Since the speed of the blades 10 relative to air increases along the span of the rotating blades, the shape of the blades is typically twisted in order to maintain a generally consistent angle of attack at most points along the span of the blade. However, such fixed twist angles are generally optimized for only one set of operating parameters for the wind turbine 2.

BRIEF DESCRIPTION OF THE INVENTION

These and other drawbacks associated with such conventional approaches are addressed here in by providing, in various embodiments, a torsionally loadable wind turbine blade, including a loading member secured to a body of the wind turbine blade; and an adjuster for actively displacing the loading member and torsionally deforming the blade on a spanwise axis.

BRIEF DESCRIPTION OF THE DRAWINGS

Various aspects of this technology will now be described with reference to the following figures ("FIGs.") which are not necessarily drawn to scale, but use the same reference numerals to designate corresponding parts throughout each of the several views.

DETAILED DESCRIPTION OF THE INVENTION

Figure 1:
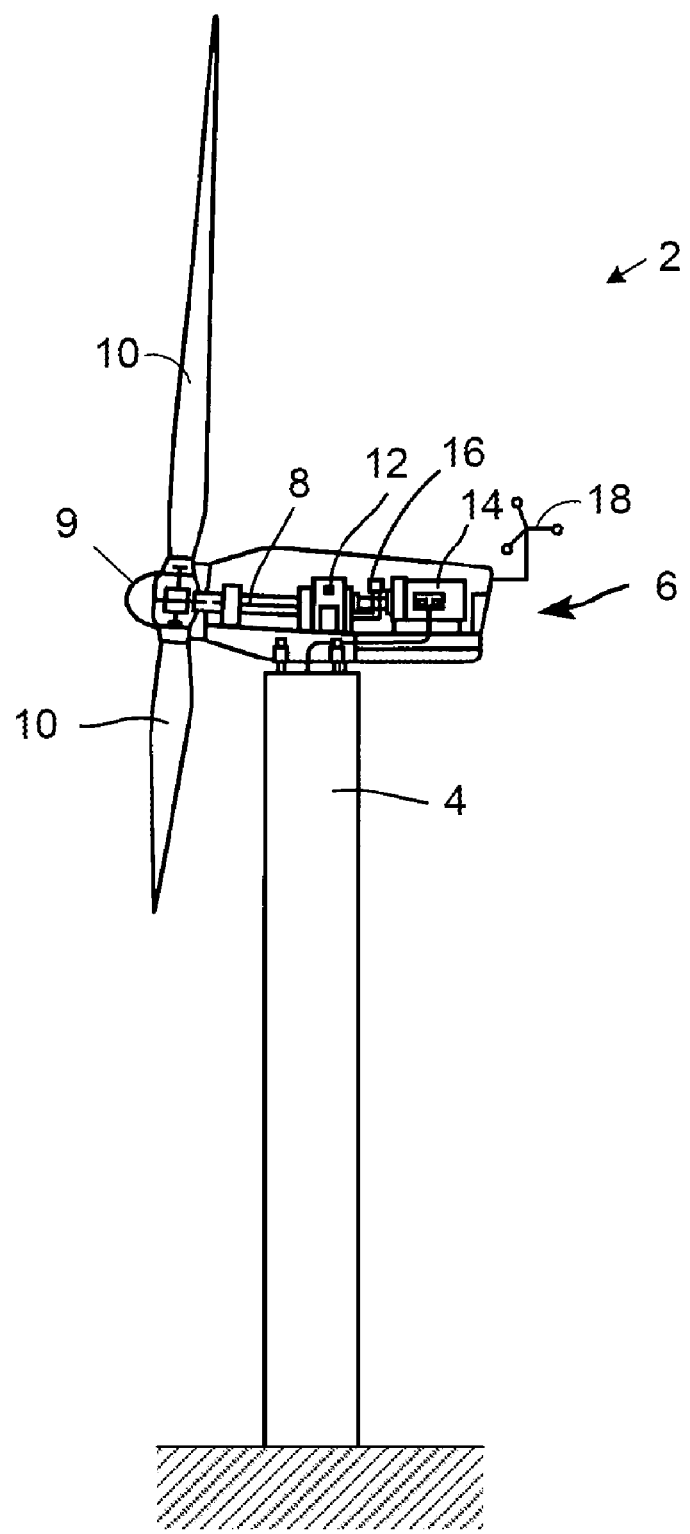
FIG. 1 is a schematic side view of a conventional wind turbine.
Figure 2:
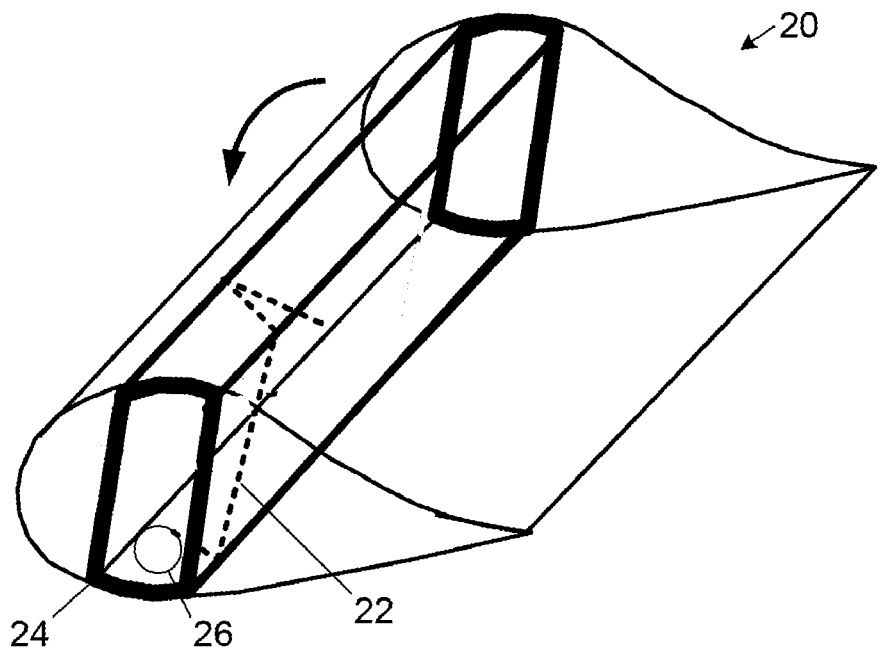
FIG. 2 is a schematic orthographic view of a spanwise portion of a wind turbine blade for use with the wind turbine shown in FIG. 1.

FIG. 2 is a schematic orthographic view of a spanwise portion of a torsionally loadable blade 20 for the wind turbine 2 shown in FIG. 1 or any other wind turbine. For example, the blade 20 may be used to replace the conventional blades 10 shown in FIG. 1.

The blade 20 includes one or more loading member(s) 22 secured at one or more locations of a body of the wind turbine blade 20. For example, as illustrated in FIG. 2, the loading member 22 may be secured to the spar 24. Although FIG. 2 illustrates the loading member 22 being wrapped around the inside of the spar 24, it may also be arranged in other configurations, including on the outside of the spar. An adjuster 26 is also provided for actively displacing the loading member 22 and torsionally deforming the blade 20 on its spanwise axis. Suitable elasticity may also be provided with air pressure in cylinders or bellows.

In various embodiments, the loading member 22 may be as stiff as possible along its loaded axis and as flexible as possible along the bending axis so that it does not interfere with the bending deformation of the blade 10. For example, the flexibility may be elastic in a linear or non-linear configuration. The loading member 22 may also be arranged in such a way that the spar cap is torsionally loaded.

Figure 3:
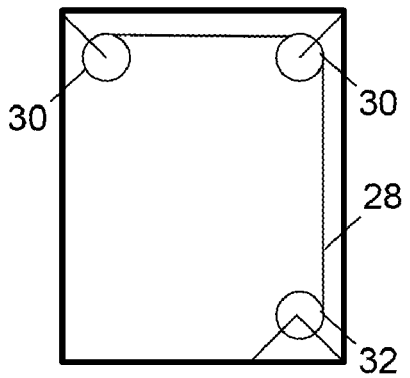
FIG. 3 is a schematic cross-sectional view of the spar in FIG. 2.

As illustrated in the schematic cross-sectional view of the spar 24 shown in FIG. 3, the loading member 22 includes a rope, or cable 28. The cable 28 is slideably supported on the inside of the spar 24 by pulleys 30. Although three pulleys 30 are illustrated in the corners of the spar 24, any other number and/or arrangement may also be used. Alternatively, or in addition, the cable 28 may be supported by hooks or loops. A tensioner 32 is provided for actively tensioning and/or releasing the cable 28. For example, the tensioner 32 may be a cable winder that is controlled by the control system 16 (FIG. 1) or pitch drive in response to one or more operating parameters of the wind turbine 2.

Figure 4:
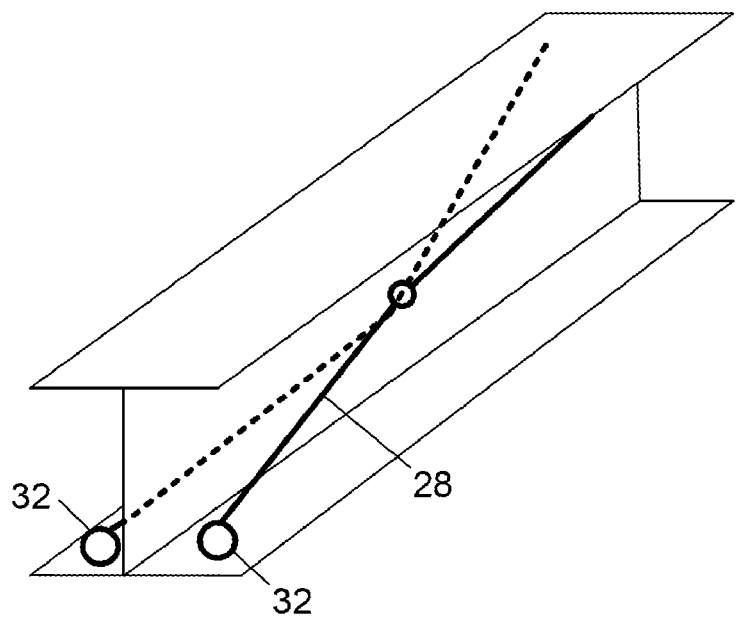
FIG. 4 is a schematic orthographic view of a spar for use with the wind turbine blade shown in FIG. 2.

Other arrangements for the cable 28 may also be provided. For example, as illustrated for the I-shaped spar 24 in FIG. 4, the cable 28 may be arranged to extend between upper an lower flanges on opposites sides of the spar. A second cable may also be provided on the opposite side of the spar 24 for rotationally-deforming the spar in the opposite direction.

Figure 5:
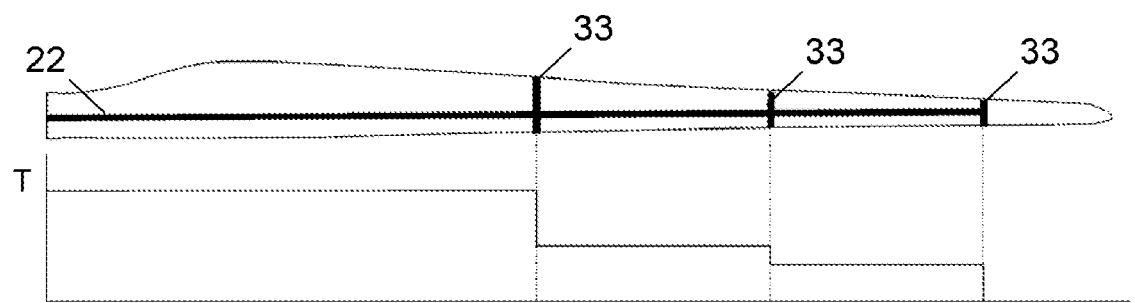
FIG. 5 is a plot of torque versus span for the wind turbine blade shown in FIG. 5.

Multiple loading members 22 and adjusters 26 may be provided in different sections of the blade 20. For example, since the blade 20 is relatively stiff near the root as compared to at the tip, torsional loads may be concentrated in areas that have a lower than average stiffness in order to achieve maximum deformation. Alternatively, or in addition, as illustrated in FIG. 5, loading may be provided by rotation and/or incremental steps. For example, higher levels of torque T may be provided near the root of the blade 20 as compared to sections of the blade closer to the tip in order to achieve a desired rate of deformation along the span. If more than one location is used, the amount of torsion applied at a particular point may be tuned by providing flexible isolation elements 33 that are mounted between the blade structure (e.g., ribs) and the loading member 22. The torque and corresponding deformation is each of the resulting sections of the blade 20 may then be controlled independently in order to achieve various deformation rates along the span of the blade 20. A torsional rotation range may also be provided in which no load is transmitted.

Figure 6:
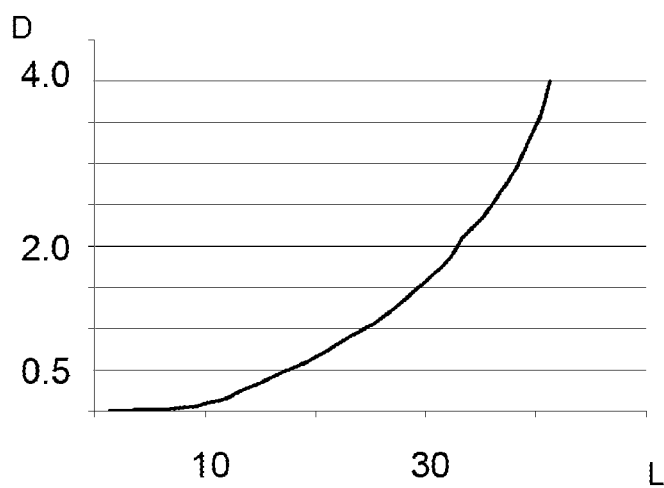
FIG. 6 is a plot of torsional deformation versus spanwise location.

For example, it is expected that the technology described above will provide a typical forty-meter blade 10 available from General Electric Corporation with a roughly exponentially increasing torsional deformation D, in degrees, along the length of the span L, in meters, as shown in FIG. 6. The force needed to rotate the tip by about 4 degrees using a cable 28 that is attached inside the spar 24 is expected to be about 40 kN, using 70% of the height and 60% of the width of the spar. An aramid rope of 11 mm diameter will elongate about 2% at this load, over the used length that means 2% over approximately 80 meter or about 1.5 meters. A winch or a linear actuator may then be used to load the rope.

Figure 7:
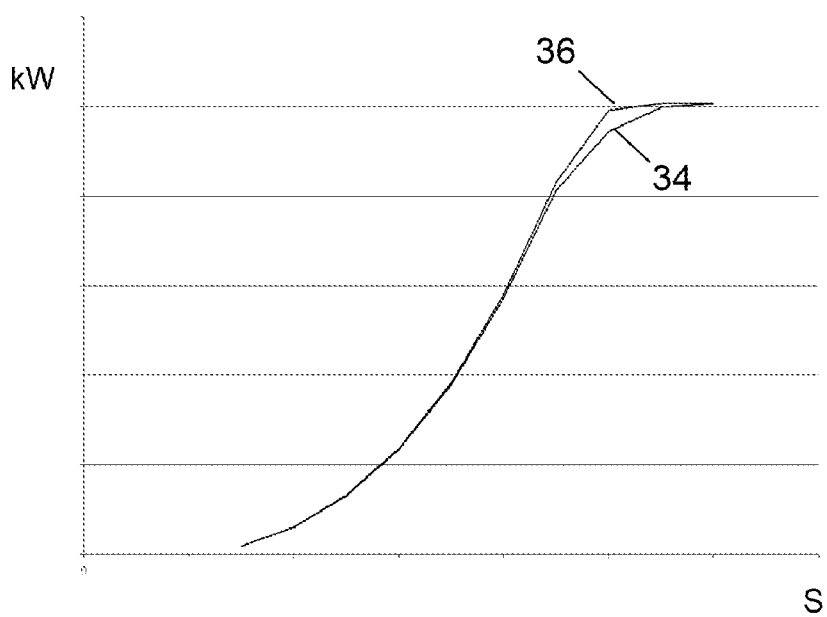
FIG. 7 is a plot of electrical power versus wind speed.

FIG. 7 shows a power curve 34 for a typical blade 34 and a power curve 36 for the blade 20 having the torsional deformation illustrated in FIG. 6. FIG. 7 illustrates the increased power that is expected to be obtained for the torsionally deformable blade 20, particularly just below rated wind speeds, whereby the annual energy production is expected to increase by about 1.1%.

The technology described above offers various advantages over conventional approaches. It allows the blade 20 to be torsionally deformed so that the angle of attack for a given pitch at off-design wind speeds is closer to an optimum value. The optimum angle of attack over the blade length may then be obtained at a wider range of wind speeds. Energy capture can therefore be enhanced.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A torsionally loadable wind turbine blade, comprising:
   a loading member secured to a spar of the wind turbine blade; and
   an adjuster for actively displacing the loading member and torsionally deforming the spar on a spanwise axis.

2. The torsionally loadable wind turbine blade recited in claim 1, wherein the deforming is elastic deforming of the spar material.

3. The torsionally loadable wind turbine blade recited in claim 1, wherein the loading member comprises a tension member.

4. The torsionally loadable wind turbine blade recited in claim 1, wherein the tension member comprises a cable.

5. The torsionally loadable wind turbine blade recited in claim 4, wherein the adjuster comprises a cable tensioner.

6. The torsionally loadable wind turbine blade recited in claim 1, wherein the adjuster comprises a tensioner.

7. The torsionally loadable wind turbine blade recited in claim 1, further comprising a controller for controlling the adjuster.

8. A torsionally loadable wind turbine blade, comprising:
   a loading member secured to a body of the wind turbine blade; and
   an adjuster for actively displacing the loading member and torsionally deforming the blade on a spanwise axis;
   wherein the tension member comprises a cable;
   wherein the tension member comprises a cable; and
   at least one pulley for routing the cable along the body of the wind turbine blade.

9. A wind turbine, comprising:
   a tower;
   a gearbox connected to an electrical generator arranged on the tower;
   a blade, having a spar, for rotating the gearbox and driving the generator;
   a loading member secured to and extending spanwise along the spar; and
   an adjuster for actively for actively displacing the loading member and torsionally deforming the spar on a spanwise axis.

10. The wind turbine recited in claim 9, further comprising a controller for controlling the adjuster.

11. The wind turbine recited in claim 10, wherein the loading member comprises a tension member.

12. The wind turbine recited in claim 11, wherein the tension member comprises a cable.

13. A wind turbine, comprising:
   a tower;
   a gearbox connected to an electrical generator arranged on the tower;
   a blade, having a spar, for rotating the gearbox and driving the generator;
   a loading member secured to the spar;
   an adjuster for actively for actively displacing the loading member and torsionally deforming the blade on a spanwise axis;
   a controller for controlling the adjuster;
   wherein the loading member comprises a tension member;

wherein the tension member comprises a cable; and
at least one pulley for routing the cable along the spar.

14. A wind turbine, comprising:
a tower;
a gearbox connected to an electrical generator arranged on the tower;
a blade, having a spar, for rotating the gearbox and driving the generator;
a loading member secured to the spar;
an adjuster for actively for actively displacing the loading member and torsionally deforming the blade on a spanwise axis; and
a second loading member secured to the spar at a different location from the first loading member.

* * * * *